Sept. 22, 1959     R. L. LLOYD     2,904,899
EDUCATIONAL BANKING GAME FOR TEACHING
CHILDREN GOOD THRIFT HABITS
Filed Sept. 7, 1954
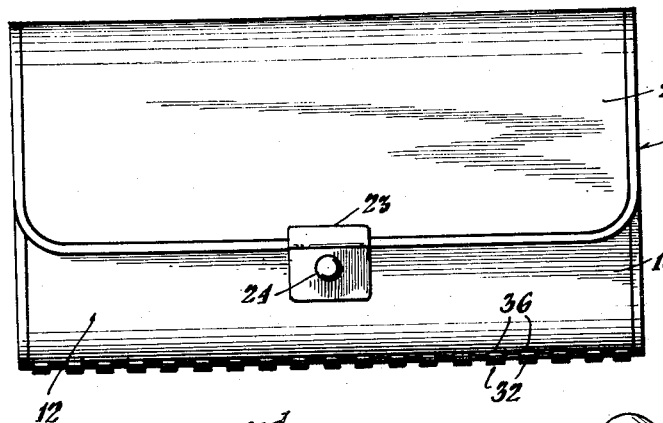
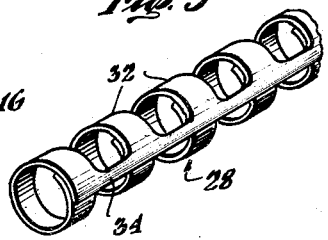
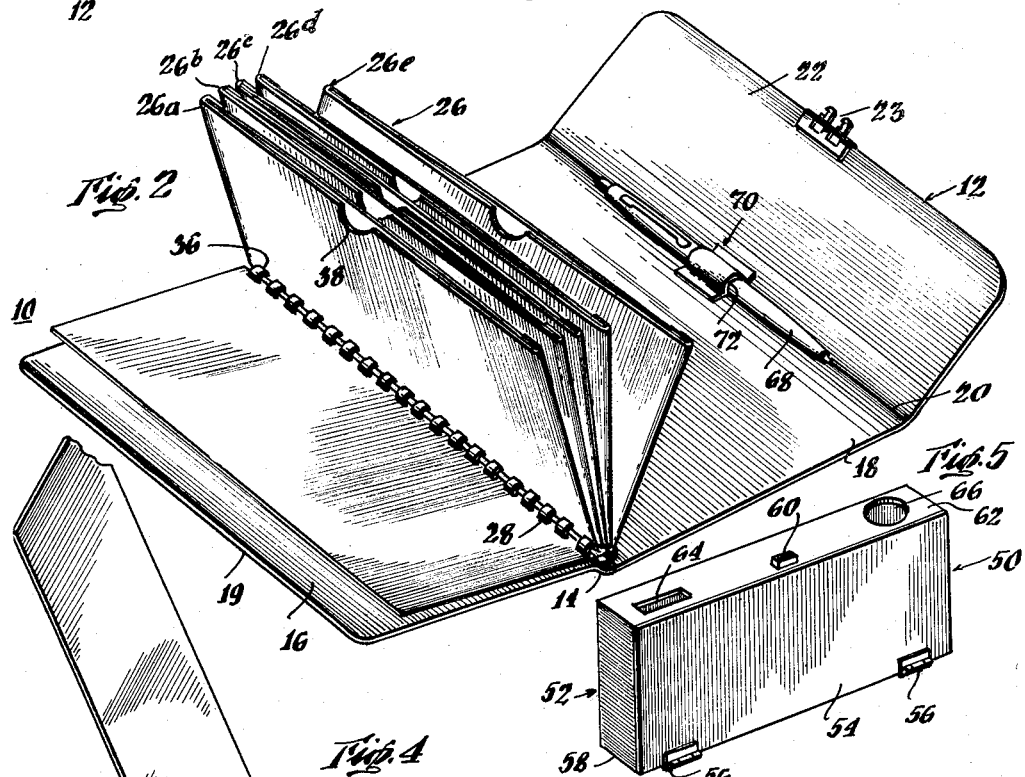
INVENTOR
Robert L. Lloyd
BY
Eyre, Mann & Burrows
ATTORNEYS

2,904,899

United States Patent Office

Patented Sept. 22, 1959

2,904,899
EDUCATIONAL BANKING GAME FOR TEACHING CHILDREN GOOD THRIFT HABITS

Robert L. Lloyd, Port Washington, N.Y.

Application September 7, 1954, Serial No. 454,387

1 Claim. (Cl. 35—24)

This invention relates to an educational banking game for children which is fun to play and which teaches good thrift habits as well as an appreciation of the way in which bank checking systems operate.

In accordance with the game of my invention I provide a banking kit which includes a check book with detachable play checks and stubs for accounting, a receptacle for cancelled checks, envelopes for banking by mail, a savings account pass book, coin bank, and pen. The game is played by giving each participating child a banking kit, and some adult member of the family is designated as the banker. At the start of the game, the children are given a credit which is entered in the check book and checks are then drawn against this credit as the need for cash arises. Check writing continues for a designated period of time, say, one week, and then the banker receives and honors all outstanding checks and audits each of the children's check books. Overdrawn accounts are penalized either by a set charge or by refusal of the banker to honor the check. The banker marks "paid" on the checks he honors and these cancelled checks are then turned over to the children who place them in the cancelled check receptacle of the banking kit. Bank account credits are given at the time of the weekly audit, either on the basis of a set weekly allowance or for work done around the home. Any cash received by the child as a gift or otherwise is placed in the coin box of the kit and this cash is then turned over to the banker and entered as a credit in the check book at the time of audit. When the credit in an account is built up above a certain designated maximum amount the child makes out a check to himself and the banker is then called upon to honor this check by depositing the amount in a savings account established in a local bank. The child assists in making out the deposit slip and the deposit is made at the bank or mailed to the bank in one of the envelopes provided for this purpose. After the deposit is made the child holds the savings account pass book in his banking kit.

The game of my invention and the way in which it is played may be clearly understood by reference to the accompanying drawings in which a preferred form of my banking kit is illustrated.

Fig. 1 is a plan view of the preferred form of banking kit;

Fig. 2 is an isometric view of the kit of Fig. 1 in open condition;

Fig. 3 is an isometric view of a preferred form of fastener used in the banking kit of Fig. 1;

Fig. 4 illustrates the play check book of the banking kit; and

Fig. 5 illustrates a preferred form of coin box.

Referring now to the drawings, banking kit 10 includes a cover member 12 which is made up of a strip of flexible material such as paper, leather, plastic material, or the like. The cover member is folded over lengthwise at 14 to form a front panel section 16 and a rear panel section 18. The rear panel section 18 projects above the top 19 of the front panel section (Figs. 1 and 2) and the projecting material in the rear panel section is folded over at 20 to form a closure flap 22 which is held in place over the surface of the front panel section by means of a conventional clip 23 and spring loaded catch 24. As shown in the drawings, cover member 12 forms a sturdy, protective outer covering for the kit which is in the general form of an envelope open at each side. The different elements of banking kit 10 are held in place in an orderly fashion in cover member 12 by means of a plurality of heavy paper envelopes 26 which are in turn anchored in place by means of a fastener 28 positioned along the line of fold 14 between the front and rear panel sections of cover member 12. Fastener 28 is made of resilient material such as plastic, metal or the like, and it comprises a plurality of fingers 32 spaced a predetermined distance apart from each other along one side of a connecting rib 34. Fingers 32 are permanently curled around rib 34 so that each finger overlaps itself to form a continuous circle of resilient material. A series of holes 36 positioned along fold line 14 in cover member 12 are so arranged that they readily receive fingers 32 and a corresponding series of holes 36 are positioned in the bottom of envelopes 26. By threading the fingers through the holes in cover member 12 and through the holes in envelopes 26, the envelopes may be securely anchored in a set position in the cover member looseleaf fashion. An advantage of this construction is that additional envelopes may be added to the kit as required. Each envelope 26 holds an element of the banking kit and as shown in the drawing the envelopes are open at the top and a semicircular thumb notch 38 is cut into the top of one side wall of the envelope so that it can be readily opened up.

The banking kit assembly 10 includes a set of instructions (not shown) for playing my banking game and these instructions closely follow the description set forth hereinbefore above. The first envelope 26a holds a check book 42 which is the heart of the game. A preferred form of check book 42 is shown in Fig. 4. As there shown, each check 44 is attached to its corresponding stub 46 by means of a perforated line 48. Checks 44 are marked on their face "not negotiable—no good for over $1.," and a space is provided for entering the date, check number, payee's name, amount, and the purpose for which the check is drawn. The record of account is kept on stubs 46. Each stub has a place for "balance forwarded," and under this is a notation "deposit rec'vd. from." The children are instructed to enter the amount of their weekly credit opposite the notation "deposit rec'vd from" and to mark down the source, whether it be gift, weekly allowance or credit for work done. Under this is a place for the new balance, and when a check is drawn against this balance the amount of the check is subtracted to get balance carried forw'd. A place is also provided for the date, check number, payee's name, and purpose for which the check was drawn.

The second envelope 26b holds cancelled checks (not shown) and envelopes 26c and 26d hold the savings account pass book and envelopes for banking by mail respectively. The pass book and envelopes for banking by mail (not shown) are in the form used by the local bank for this purpose. The last envelope 26e carrier a coin box 50 which may be held in the envelope or attached to its face by any convenient means. Detail construction of a preferred form of coin box is shown in Fig. 5. As there shown, coin box 50 is made up of a rectangular box member 52 in which the front wall of the box member is an individual unit separated from the box which forms a cover member 54 pivotally mounted by means of hinges 56 on the free edge of the bottom wall 58 of the box. A spring loaded release catch 60 positioned in top wall 62 of box member 52 holds the cover in place. Coins are dropped into the box through a slot 64 cut into top wall 62 and bills are rolled up and inserted through the circular hole 66. A pen 68 or other writing instrument is provided for writing out checks and for keeping a record of account and the pen is slidably mounted along the top fold line 20 of cover member 12 by means of a strip of flexible material 70 which is so attached to the cover member as to leave an open loop 72 which frictionally holds the pen in position. This completes the banking kit assembly for my game which provides fun for the whole family and the means for teaching children good thrift habits.

It will be understood that it is intended to cover all changes and modifications of the preferred embodiment of many invention herein chosen for the purpose of illustration which do not constitute departures from the spirit and scope of my invention.

I claim:

An educational banking game for teaching children good thrift habits as well as an understanding of the way in which bank checking systems operate, comprising a banking kit, a plurality of receptacle envelopes, means for pivotally mounting the plurality of receptacle envelopes within said kit, a check book, savings account pass book, and envelopes for banking by mail, said check book having a plurality of check stubs with detachable checks, said check stubs each being provided with a notation and space for entering balance brought forward, deposit received, new balance, amount of check drawn against said new balance, payee's name, date, check number, and purpose for which check was drawn and instructions to subtract the amount of check drawn, whereby a record of account may be recorded on the said check stubs, said pass book and envelopes for banking by mail having appropriate notations printed thereon in the form prescribed by the local bank for such purpose, each of said receptacle envelopes having appropriate notations printed thereon to designate the proper place for check book, cancelled checks, savings account pass book and envelopes for banking by mail, each of said receptacle envelopes being adapted to receive and hold the designated item within said kit, a coin box, means for mounting the coin box within said kit and a writing instrument and means for mounting the writing instrument within said kit.

References Cited in the file of this patent

UNITED STATES PATENTS

| | | |
|---|---|---|
| D. 170,574 | Hickey | Oct. 13, 1953 |
| 203,365 | Norrington | May 7, 1878 |
| 514,541 | Burton | Feb. 3, 1894 |
| 659,250 | McKinley | Oct. 9, 1900 |
| 897,679 | Thompson | Sept. 1, 1908 |
| 1,148,964 | Hart | Aug. 3, 1915 |
| 2,386,644 | Williams | Oct. 9, 1945 |
| 2,574,885 | Niswander | Nov. 13, 1951 |